Nov. 26, 1935.   R. R. ROEMER   2,022,433
METAL CUTTING MEANS AND METHOD
Filed May 16, 1932   2 Sheets-Sheet 1

INVENTOR.
Ralph R. Roemer.
ATTORNEYS

Nov. 26, 1935.   R. R. ROEMER   2,022,433
METAL CUTTING MEANS AND METHOD
Filed May 16, 1932   2 Sheets-Sheet 2
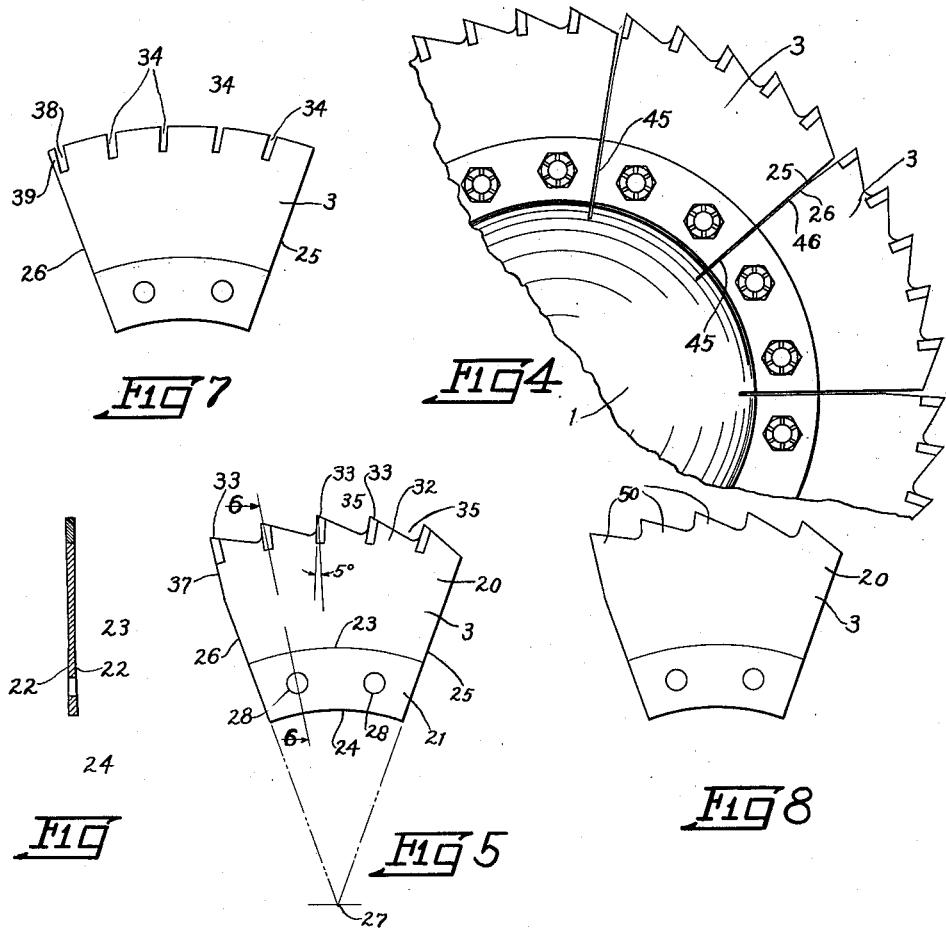
INVENTOR.
Ralph R. Roemer.
BY
Slough + Canfield
ATTORNEYS Patented Nov. 26, 1935

2,022,433

UNITED STATES PATENT OFFICE 2,022,433

METAL CUTTING MEANS AND METHOD

Ralph R. Roemer, Cleveland, Ohio

Application May 16, 1932, Serial No. 611,615

31 Claims. (Cl. 29—103)

This invention relates to means and methods for cutting metal.

The invention relates particularly to metal cutting tools of the rotary type and the methods of making and using the same.

Heretofore various metal cutting operations generally of the nature of sawing operations as distinguished from milling operations for example, have been performed on metal in various arts, the sawing tool employed being generally a circular saw with teeth on the periphery thereof constructed generally along the lines of the circular saws widely known and used for many years for sawing wood. Illustrative of the metal cutting operations commonly performed is the sawing off of pieces or lengths from metal bars.

Such circular saws are used more extensively in connection with the softer metals such as brass, copper, aluminum etc. and alloys thereof, although in some instances even iron and steel are sawed in this manner. In some arts also circular saws have been employed to cut sheet metal and metal fabricated into various special sections.

In these various arts, the common practice has been to employ a thin circular steel saw blade of substantially uniform thickness, and, following the general practice of wood sawing, to mount the saw on a rotary spindle or shaft.

It has been generally recognized and understood in the practice of sawing metal with a circular saw that, for a given saw speed, if the material is fed into the saw at a too rapid rate, the teeth of the saw quickly lose their cutting edges, and the cutting efficiency, and have to be resharpened after relatively short periods of use; and that furthermore in many instances the shock of impact of the rotating teeth with the work cracks or breaks the teeth; and that if the rate of feed be reduced in the effort to prolong the useful life of the saw and to avoid frequent sharpening of the teeth, that the rate of production by the saw will be correspondingly reduced.

Again, it has been generally recognized and understood that regardless of the rate of feed, the speed of rotation of the saw must not be reduced below certain low speeds for satisfactory cutting operations; nor increased above certain high speeds at which the shock of the tooth impact upon the material being sawed may rapidly deteriorate the teeth or break them, or at which undesirable effects of centrifugal force on the rotating blade begin to be manifested and operation of the saw becomes unsafe and inefficient.

Thus in the prior practice there has been roughly established a recognized practical safe speed range and rate of feed within which a circular saw blade must be operated to saw metal in an efficient and practical manner for production purposes in the various arts.

Now, by prolonged and exhaustive experimentation I have discovered that if a thin rotary steel saw blade be experimentally driven at higher and higher rotational speeds, and therefore at higher and higher peripheral tooth speeds, a super speed is finally reached at which the saw when employed to cut metal exhibits unexpected and heretofore unrealized phenomena.

At the super speeds referred to, the number of cuts of a bar of given size and given material at a given rate of feed, which may be made for a single sharpening of the saw, is enormously increased over that of prior practice; and of equal importance, the rate of feed and therefore the number of cuts which may be made per minute or per hour of such given size and material of bar, is enormously increased without correspondingly more rapidly deteriorating the teeth and cutting edges thereof.

Thus I have discovered contrary to what might obviously have been expected that if the rotative speed or peripheral tooth speed of a circular metal cutting saw be increased sufficiently far beyond speeds which have heretofore been considered destructive, inefficient and unsafe, an enormously increased output of the saw may be attained.

I have not definitely ascertained whether this improvement is the result of a different reaction of the cutting edges of the saw teeth upon the metal; or of a different reaction of the metal upon the saw teeth; or whether the nature of the separation of the particles of work material effected by the saw, changes at high tooth speed; but I have ascertained essential conditions by which those skilled in this art may practice the improvement.

These are, to provide a relatively thin blade rotated at a peripheral speed of 14,000 feet per minute or higher, which in the case of a 12 inch diameter blade would be 4500 revolutions or more per minute; and to mount the blade in a manner to reduce to the minimum possible, the flexibility thereof, whereby it is prevented from warping out of its plane of rotation at such high velocity; and to rotatably support the blade in rotational bearings in which lost motion, either axially or radially, is reduced to the minimum possible to prevent vibration of the blade; and to provide sufficient radial rigidity to prevent stretching of the blade by centrifugal force to prevent distortion of the path of the rapidly moving teeth from a true circle.

I have discovered that metal cutting saws of the well known pattern consisting of a flat solid circular blade or disc with teeth at the periphery thereof cannot be employed to develop the cutting efficiency above described. Such prior art blades when rotated at the velocities under consideration do not remain flat, that is, do not maintain a true rotational plane, but rotate with a weaving or wobbling complex movement and effect an uneven heat generating tooth destroying cut. Again, the strains set up in the blade due to centrifugal force, stretch the blade outwardly radially, and inasmuch as it is substantially impossible to make blades of perfectly uniform thickness and uniform density and uniform hardness, the very great centrifugal force developed by the excessively high speeds exerts greater effect upon some portions of the blade than upon others and distorts the blade out of a true circle so that only some of the teeth on the periphery will be brought into cutting engagement with the work.

Again, the necessary tooth hardness of the metal of such blades can only be attained by heat treating processes and it is substantially impossible to so temper or harden a thin disc-like blade uniformly throughout with the result that even by the most refined processes there will be left internal strains in the blade; and at almost the first attempt to use such a blade at the high speed above referred to, such prior art blades will crack partly due to the effect of submitting the internally strained portions to the effect of the centrifugal force developed, and partly due to the increased load on the teeth occasioned by the high velocity and the high rates of speed, and partly due to the fact that the blade, as above stated, distorts out of round. These cracks usually develop inwardly from the tooth roots and not only quickly terminate the life of the blade but render it unsafe to use.

I have made many attempts to find commercial saw blades of prior art forms which would stand up under the strains opposed by the high velocity which I have found to be such an improvement over prior practice; and I have had the cooperation of manufacturers who regularly make commercial saws for sawing metal, in the effort to produce a circular saw blade by which the advantages of my discoveries might be generally practiced. But all attempts made by me and by skilled saw makers for me, to produce a saw of known form and construction and by known processes which could be employed efficiently and safely to saw metal at the speed which I have discovered to be desirable, have failed.

It is therefore an object of the present invention to provide a rotary saw or metal sawing tool by which may be practiced the hereinbefore described discoveries which I have made.

Another object is to provide generally an improved rotary cutting and/or sawing tool.

Another object is to provide generally an improved rotary metal sawing and/or metal cutting tool.

Another object is to provide an improved rotary metal cutting tool particularly adapted to be rotated at high velocities.

Another object is to provide a rotary metal cutting tool having a heat treated hardened relatively thin cutting blade portion constructed in a manner to reduce internal strains produced by the heat treating process.

Another object is to provide such a tool constructed in a manner to reduce flexibility in the plane of rotation of the blade.

Another object is to provide such a tool constructed to reduce the effect of centrifugal force tending to distort the blade out of round, out of a plane, etc.

Another object is to provide a rotary metal cutting tool having a relatively thin blade portion comprising a plurality of toothed segments and improved means for mounting and supporting the segments to compose a circular toothed periphery.

Another object is to provide an improved method for cutting and/or sawing material.

Another object is to provide an improved method of making a rotary cutting saw or the like cutting tool.

Another object is to provide an improved rotary tool which may be employed for cutting and/or sawing metal and a means of operating the same whereby a greater number of given cuts may be made per minute or per hour.

Another object is to provide such an improved tool and method of using the same whereby a greater number of given cuts may be made between successive sharpening operations upon the saw.

Other objects will be apparent to those skilled in the art to which my invention appertains.

My invention is fully disclosed in the following description taken in connection with the accompanying drawings, in which:—

Fig. 4 is a view from the rear of a portion of the tool of Fig. 1;

Fig. 5 is a view of a toothed segment illustrated separately and forming part of the tool of Fig. 1;

Fig. 6 is a sectional view taken from the plane 6 of Fig. 5;

Fig. 7 is a view of a part of the sector shown in Fig. 5 illustrating one of the steps of constructing the same;

Fig. 8 is a view similar to Fig. 5 illustrating a modification;

Figure 1:
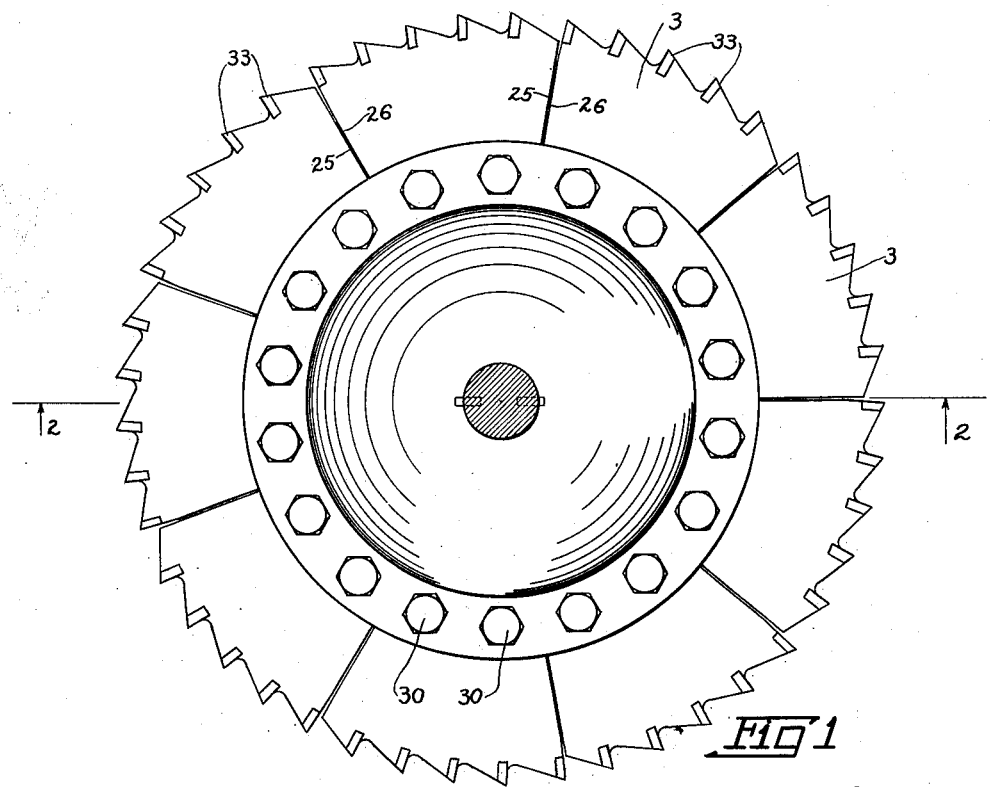
Fig. 1 is a front elevational view of a rotary cutting tool embodying my invention, and illustrating a portion of a spindle upon which the same is mounted.

Referring to the drawings, I have shown at 1 a central hub element and at 2 a second hub element associated therewith and clamped between the hub elements a plurality of tooth sectors 3—3.

The hub element 1 may be formed from a casting or by drop forging or other processes and comprises a central hub portion 4, generally of cylindrical form, and having an external cylindrical machined surface 5. The hub portion 4 is internally finished with a taper bore 6 to accurately coaxially fit the tapering end 7 of a shaft or spindle 8 upon which the tool is to be mounted.

The inner wall of the hub 4 may be provided with a pair of diametrically opposite keyways 9—9 to engage a corresponding pair of Woodruff keys 10—10 lodged in suitable seats in the taper portion 7.

Two keyways 9 and keys 10, preferably identical, are employed and disposed diametrically oppositely to balance the same.

Outwardly from the hub portion 4, the hub element 1 is generally of dish form having a wall 11 formed integrally with the hub portion 4 at one end thereof and concave toward the hub. A peripheral flange 12 is integrally formed on the wall 11 and the inner face of the flange 12 is accurately machined to provide an annular shoulder 13 and a frusto-conical surface 14, the cone angle of which is slightly less than 180° and the produced apex of the cone substantially coinciding with the axis of the bore 6.

The wall 11 and flange 12 are relatively massive for purposes to be described.

The hub element 2 is provided with a hub portion 15 having a central cylindrical bore 16 machined to accurately telescopically fit upon the cylindrical surface 5 of the hub portion 4; and the hub element 2 is generally dish form, concave inwardly and provided with a wall 17 terminating in a peripheral flange 18 axially opposite the flange 12.

The flange 18 is inwardly machined to provide a second frusto-conical surface 19 of substantially the same conical angle and disposition of cone apex as the surface 14.

The hub element 2 is relatively massive and may be formed from a casting or by drop forging or other processes. The hub elements 1 and 2 are constructed to be symmetrical around the axis of the bore 6 so that when rotating at relatively high speeds, they will be sufficiently balanced, statically and kinetically, to reduce vibration which might otherwise be set up therein, to a negligible amount. This may be effected either by accurately forming the two hub elements in the first instance, or by machining them all over after being formed, or by artificially balancing them after being made, or by other means known to the art.

Figure 2:
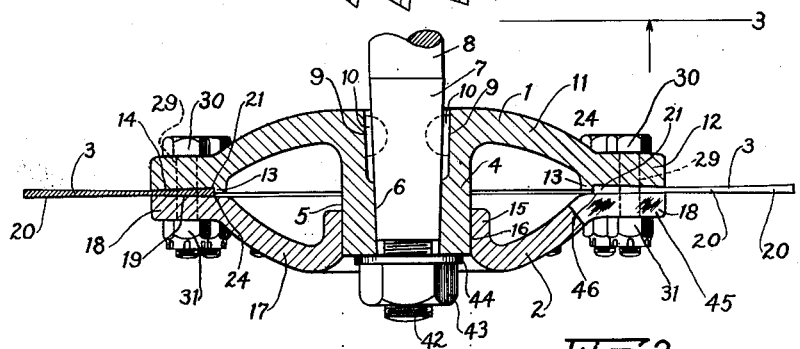
Fig. 2 is a cross-sectional view taken approximately from the plane 2—2 of Fig. 1.
Figure 3:
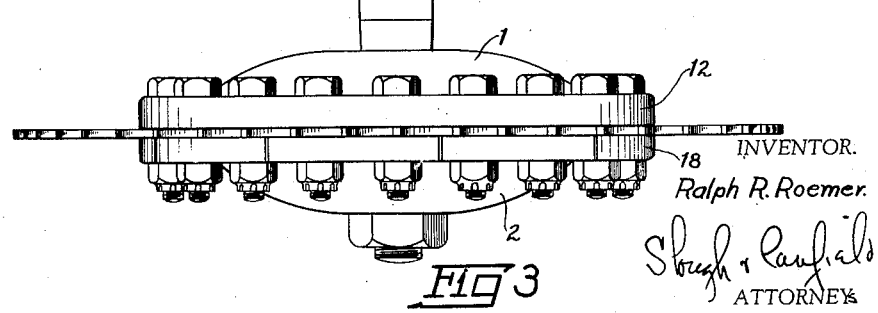
Fig. 3 is a side elevational view of the tool of Fig. 1 taken from the plane 3 of Fig. 1.

The blade elements 3—3, one of which is shown separately in Figs. 5 and 6, comprise each a blade proper 20 and a head 21. The head 21 is formed in cross-section as shown in Figs. 2 and 6. It has opposite frusto-conical surfaces 22—22 adapted to coincide with the faces 14 and 19 of the hub elements 1 and 2 when the head 21 is disposed therebetween and brought into assembled position therewith. The head, as viewed from the front as in Fig. 5 is circular as at 23 and 24 at the inner and outer terminations of the frusto-conical surfaces 22—22, the circular portions 23 and 24 therefore being concentric with the bore 6 when the heads are in the assembled arrangement of Fig. 2 referred to, and the shoulder 13 is so disposed that when the surfaces 22—22 are in accurate coincidence with the surfaces 14 and 19, the circular portion 24 of the head 21 engages and coincides with the circular shoulder 13 on the hub element 1.

The blades 20 outwardly from the circular portion 23 are also frusto-conical and of generally the same cone apex angle as the heads 21, but with the cone apex disposed laterally from the above mentioned axis of the bore 6; and the blade proper 20 is preferably of greater radial extent than the head 21.

The blade elements 3 are generally of sector form as clearly shown in Fig. 5, and thus side edges 25 and 26 thereof are generally along the lines of radii from the center 27 which is adapted to lie coincident with the axis of the bore 6 when the sectors are assembled in the tool.

The included angle between the edges 25 and 26 is such that when a plurality of the blade elements 3 is assembled with the hub elements 1 and 2 as above described and as shown in Figs. 1 and 2, the head 25 of one segment may be spaced, circumferentially, from the edge 25 of the next adjacent segment and with the adjacent edges 25—26 in each case substantially radial or, if these edges are not strictly radial, substantially parallel.

Each of the heads 21 of the blade elements 3 is provided with a pair of accurately disposed and accurately formed holes 28—28, and the flanges 12 and 18 of the hub elements 1 and 2 respectively are provided with a circular series of accurately disposed and mutually axially aligned holes 29—29, and the holes 28 are so disposed with respect to each other and to the center 27, that when the blade heads 21 are in the assembled position of Figs. 1 and 2, the holes 28 may be aligned with the holes 29, and bolts 30—30 may be projected through the aligned holes to rigidly clamp the flanges 18 and 12 upon the heads 21 and with the edge 24 coincident with the shoulder 13, and with the frusto-conical surfaces 22—22 of the heads 21 in coincidence with the frusto-conical surfaces 14 and 19 of the flanges; and nuts 31—31 may be screwed on the ends of the bolts to clamp the parts together in a rigid structure.

The blade elements 3 are preferably all made identical so that when the blades are assembled as above described, the structure will be symmetrical around the axis of the bore 6 and therefore balanced.

Each of the blade elements 3 has teeth formed on the outer peripheral portion 32 thereof as shown generally at 33—33 and in the preferred mode of construction these are provided as follows.

As illustrated in Fig. 7, a plurality of slots 34—34, one for each tooth, are first cut in the blade portion proper 20, of the segment. Blocks or inserts of very hard material such for example as tungsten carbide are inserted in the slots 34—34 and rigidly secured in the slots by any suitable process as for example by brazing with copper. A part of the segment material between the slots 34—34 is then cut away as at 35—35, Fig. 6, and teeth are thus formed, the cutting edges of which are on the inserts.

Preferably the direction of the slots 34—34 is such that the face of the insert will not be exactly radial but will have a rearward inclination or "rake" of preferably approximately 5° as illustrated in Fig. 6.

The entire blade element 3 as illustrated in Figs. 5 and 6 is preferably finished very accurately all over as by grinding; and after they are assembled in the complete tool as illustrated in Figs. 1 and 2, the blade portions proper, 20, projecting from the flanges 12 and 18 may be again ground in assembled position during rotation of the assembled tool around the axis of the bore 6 as for example when mounted on a rotating spindle 8.

Similarly, a finishing grinding operation may be performed on the teeth 33—33 after the complete assembly of the segments with the hub elements, to dispose the cutting edges of the teeth in a perfect circle and to cause the teeth and the blade portion 20 to rotate accurately in rotational planes.

One of the slots 34, for example the slot 38 may be formed near the adjacent edge 26 of the segments 3, and after the insert is secured therein, the thin tongue of metal as at 39 may be cut away, as for example as shown in Fig. 5 leaving a segment edge 37 substantially parallel with the forward face of the corresponding tooth 33.

The entire blade element 3 may be heat treated to suitably harden the same at any stage of the process of its manufacture but preferably they are hardened after the application of the inserts thereto.

I have found by experiment that for a tool having teeth on a 12 inch diameter, a suitable number of segments is nine and a suitable number of teeth for each segment is five, thus making a total of forty-five teeth for a saw of 12 inches in diameter.

I have also found that for a saw of this diameter, a suitable radial extent for the blade element 3 is approximately 3 inches from the circular edge 24 to the outer edges of the teeth 33.

I have found that with these dimensions, the segments are small enough, when designed as hereinabove set forth, to permit of hardening them without internal strains or with internal strains of negligible amount; and that the centrifugal force developed therein is ineffective to change their shape appreciably notwithstanding the relative thinness of the metal composing them; and that a saw of these general dimensions and number of teeth when rotated at the high speeds hereinbefore discussed, has none of the disadvantages and inefficiencies of saws of the prior art hereinbefore referred to and does effect the advantages of the high speed of rotation above discussed, but which have heretofore been unavailable in practice because of the inability of the prior art saws to stand up to the work at these speeds as above discussed.

In Fig. 2 is illustrated the preferred mode of mounting the tool upon the shaft 8. A threaded shank 42 of the shaft 8 extends outwardly through the hub portion 4 and a nut 43 and washer 44 overlap the end of the hub and thus draw the tapering shaft into the tapering bore 6. The taper wall may in some instances be relied upon to drive the saw but I prefer to employ the keyways 9 and keys 10.

From the above described construction it will appear that the hub element 2 is centered coaxially with respect to the hub element 1 and that the toothed blade elements 3 are centered coaxially therewith so that the entire saw is in balance and the teeth may rotate in true planes of a true circle at all velocities.

In Fig. 4, as illustrated at 45—45, a plurality of slots (see 45 also in Fig. 2), aligned with the spaces 46 between the edges 26 and 25 of adjacent blade elements 3 is provided. As shown in these figures, the slots 45 extend radially inwardly through the flange 18 of the hub element 2 to a point 46 inwardly of the base or circular edge 24 of each blade element 3. The purpose of these slots 45 is to give a slight degree of resilience to the flange 18 and portions thereof lying upon the heads 21 of the blade elements 3, whereby to insure that each head 21 of the several blade elements 3 will be individually and independently and therefore rigidly clamped upon the flange 12 and between the flanges 18 and 12. With this arrangement, a lesser degree of accuracy is required to insure that all the blades will be rigidly clamped between the flanges.

In Fig. 8 I have shown a modification in which the teeth of the blade element 3 such as the teeth 50—50 are formed directly upon the blade portion 20 of the element and not upon metal inserted therein.

My invention is not limited to the exact details of construction shown and described hereinbefore. Many modifications and changes may be made within the scope and spirit of my invention without sacrificing its advantages.

I claim:—

1. In a metal cutting saw, a laterally and radially non-flexible hub, an annular series of thin metal blades provided each with a plurality of teeth, the teeth of the several blades disposed in a circle, and the blades inwardly of the teeth secured to the peripheral portions of the hub, and means to secure the hub upon a rotatable shaft the blades being hardened by heat treating and of restricted area to cause the hardening effect to be substantially uniform throughout the blade and of restricted radial extent to cause the stretch of the blade to be negligible when rotated at peripheral speeds of 14,000 feet per minute or higher.

2. In a metal cutting saw, a hub comprising a pair of hub elements having opposite annular portions, an annular series of thin metal blades provided each with a plurality of teeth, the teeth of the several blades disposed in a circle, the blades having each a radially inwardly disposed head portion of wedge shape in cross-section clamped between the annular portions of the hub elements the blades being hardened by heat treating and of restricted area to cause the hardening effect to be substantially uniform throughout the blade and of restricted radial extent to cause the stretch of the blade to be negligible when rotated at peripheral speeds of 14,000 feet per minute or higher.

3. In a metal cutting saw, a hub comprising a pair of hub elements having annular portions provided with opposite frusto-conical surfaces, an annular series of thin metal blades provided each with a plurality of teeth, the teeth of the several blades disposed in a circle, the blades having each a radially inward head portion of double segmental frusto-conical form clamped between the frusto-conical surfaces of the hub elements the blades being hardened by heat treating and of restricted area to cause the hardening effect to be substantially uniform throughout the blade and of restricted radial extent to cause the stretch of the blade to be negligible when rotated at peripheral speeds of 14,000 feet per minute or higher.

4. In a metal cutting saw, a radially and axially rigid hub, an annular series of thin metal blades provided each with a plurality of teeth, the teeth of the several blades being disposed in a circle and the blades inwardly of the teeth secured to the hub, the hub comprising a pair of one-piece hub elements having radially outwardly extending flanges and the blades being clamped between the flanges, one hub element having a central hub portion bored coaxially of the tooth circle for securing it on a shaft to rotate therewith, the other hub element having a coaxial bore telescopically fitted on a corresponding cylindrical portion of the one hub element to center it thereon, and the combined one-piece hub elements having greater thickness at the axis than the combined thickness of the blades and hub element flanges whereby to render the hub of triangular cross-section laterally of the axis to provide the maximum of rigidity per unit of material.

5. In a saw, a central hub and an annular series of multi-toothed segmental blades secured to the hub and the teeth of the blades disposed in a circle, the blades having the form of thin flat sheet metal segments with a face cut away to provide inwardly radial relief on the outer portions of the blades and to render the blade of wedge shape on all radial sections and a segmental frusto-conical head on the inner portions of the blades for securing it to the hub.

6. In a saw, a central hub and an annular series of multi-toothed segmental blades secured to the hub and teeth of the blades disposed in a circle, the blades having the form of thin flat sheet metal segments with opposite faces cut away to provide inwardly radial relief on the outer portion of the blade and to render the blade of wedge shape on all radial sections and a segmental double frusto-conical head on the inner portion of the blade for securing it to the hub.

7. The method of making a metal cutting circular saw having peripheral teeth which can be rotated at peripheral speeds of 14000 feet per minute or higher substantially without distortion of the original circular path of the teeth either axially or radially, for rapidly sawing metal, which includes making a plurality of thin annulus-segment metal blades to a common annulus center, with teeth on their outer circular portions, forming the segments to such restricted overall predetermined area as to admit of hardening then substantially uniformly throughout, and with negligible internal strains, by heat treatment process, forming the segments to such restricted predetermined radial extent as to reduce, to negligible amount, radial stretch of the segments when hardened by heat treatment and revolved around the segment center at toothed peripheral speeds of 14000 feet per minute or higher, heat treating the segments to harden them, making a metal hub substantially symmetrical around an axis of rotation and distortionless both radially and axially when revolved at 4500 revolutions per minute or higher, and rigidly securing the radially inward portions of the segments to radially outer peripheral portions of the hub and with the teeth of the segments disposed in a circle.

8. In a metal cutting circular saw having a peripheral circle of teeth and rotatable at speeds of 14000 feet per minute or higher substantially without distortion of the original circular path of the teeth either axially or radially, for rapidly sawing metal, a plurality of thin annulus-segment metal blades having a common annulus center and having teeth on the outer circular portions, a hub rigidly connected to the segments on radially inward portions thereof and the hub being rigid and axially and radially distortionless when rotated at 4500 revolutions per minute or higher, the segments being hardened by heat treating process and being of such restricted predetermined overall area as to cause the effect of the heat treatment to be substantially uniform throughout the segments and to cause the segments to be substantially free from internal strains, and the hardened segments being of such restricted radial extent as to rotate substantially without radial stretch at velocities of 14000 peripheral feet per minute or higher.

9. The method of making a thin metal saw blade segment which includes forming a segmental blade of flat metal having generally parallel faces with teeth on the outer circular portion thereof, cutting away a face of the blade to progressively greater depth on portions successively farther from the teeth to form the blade of wedge shape on all radial sections to provide relief inwardly of the teeth, and inwardly of the relief portion cutting away a face of the blade to progressively lesser depth on portions successively farther from the relef portion to provide a hub engageable portion wedge-shaped in radial cross-sections and of generally frusto-conical segmental form.

10. The method of making a thin metal saw blade segment which includes forming a segmetal blade of flat metal having generally parallel faces with teeth on the outer circular portion thereof, cutting away both sides of the blade to progressively greater depth on portions successively farther from the teeth to form the blade of wedge shape on all radial sections to provide relief inwardly of the teeth, and inwardly of the relief portion cutting away both faces of the blade to progressively lesser depth on portions successively farther from the relief portion to provide a hub-engageable portion wedge-shape in cross-section on all radial sections and of generally double frusto-conical segmental form.

11. A metal cutting saw comprising a rigid hub and an annular series of segmental blades providing a circle of teeth at their radially outer circumferential portions, and rigidly secured at radially inward portions to the hub, the over-all area of the blades being restricted to permit uniform hardening by heat treatment thereof to cause them to withstand without cracking the shock of impact of rapidly feeding the teeth into metal to be sawed when the teeth are rotated at a speed of 14000 feet or higher, and the blades being of restricted radial extent outwardly from the hub to permit the blades to be rotated at said tooth speed with negligible radial stretch of the blades.

12. In a saw, a central hub and an annular series of multi-toothed segmental blades, the teeth thereof being disposed in a circle, the blades having the form of thin flat sheet metal segments with a face cut away to provide inwardly radial relief on the outer portions of the blades and to render the blades of wedge shape on all radial sections and with a face cut away to provide a segmental frusto-conical head on the inner portions of the blades, and the hub comprising a pair of flanges and means to clamp the blade heads between the flanges, one flange having a frusto-conical surface for clampingly engaging the frusto-conical surface of the blade heads.

13. In a saw, a central hub and an annular series of multi-toothed segmental blades, the teeth of which are disposed in a circle, the blades having the form of thin flat sheet metal segments with opposite faces thereof cut away to provide inwardly radial relief on the outer portions of the blades and to render the blade of wedge shape on all radial sections and the opposite faces cut away to provide a double opposite frusto-conical segmental head on the inner portions of the blades and the hub comprising a pair of flanges and means to clamp the blade heads between the flanges, the flanges having opposite frusto-conical surfaces thereon for clampingly engaging the frusto-conical surfaces of the blade heads.

14. A saw as described in claim 12 and in which the frusto-conical portions of the blade head and of the hub flange are of substantial radial extent and the means for clamping the blades between the flanges comprises an annular series of bolts projected through the flanges and through intermediate portions of the frusto-conical surfaces whereby to effect a substantially equal clamping pressure on all portions of the frusto-conical surfaces.

15. A saw as described in claim 13 and in which the frusto-conical portions of the blade heads and of the hub flanges are of substantial radial extent and the means for clamping the blades between the flanges comprises an annular series of bolts projected through the flanges and through intermediate portions of the frusto-conical surfaces whereby to effect a substantially equal clamping pressure on all portions of the frusto-conical surfaces.

16. A metal cutting tool comprising a rigid hub and an annular series of segmental blades providing a circle of cutting teeth at their radially outer circumferential portions and rigidly secured at radially inward portions to the hub, the overall area of the blades being restricted to permit each blade to be hardened by heat treatment substantially without the development of internal strain to cause the blades to withstand without cracking the shock of impact of feeding the teeth into metal to be cut at the peripheral speed of 14,000 feet per minute or higher, and to permit hardening of all of the blades to the same hardness to give the saw substantially the same cutting rate at all parts of the circle teeth.

17. A metal cutting tool comprising a rigid hub and an annular series of segmental blades providing a circle of cutting teeth at their radially outer circumferential portions and rigidly secured at radially inward portions to the hub, the overall area of the blades being the same for all the blades throughout the saw and the said area being restricted to permit each blade to be hardened by heat treatment substantially without developing internal strains therein to cause the blades to withstand without cracking the shock of impact of feeding the teeth into metal to be cut at the peripheral speed of 14,000 feet per minute or higher, and to permit hardening of all of the blades to the same hardness to give the saw substantially the same cutting rate at all parts of the circle of teeth.

18. In a saw, a central hub and an annular series of multitoothed blades, the teeth thereof being disposed in a circle, the blades having the form of sheet metal segments with a face of each segment cut away to provide a head having a frusto-conical surface on a radially inner portion of the blade, the hub comprising a pair of flanges of substantial radial extent one of which has a frusto-conical surface conforming to the frusto-conical surface of the blade head, and means to secure the blades to the flanges comprising means to clampingly draw the flanges upon opposite sides of the blade heads, and elements projected axially through aligned perforations in the flanges and in intermediate portions of the frusto-conical surfaces.

19. In a saw, a central hub and an annular series of multi-toothed blades, the teeth thereof being disposed in a circle, the blades having the form of sheet metal segments with opposite faces of each segment cut away to provide a head having double opposite frusto-conical surfaces on a radially inner portion of the blade, the hub comprising a pair of flanges of substantial radial extent having frusto-conical surfaces conforming to the frusto-conical surfaces of the blade heads and means to secure the blades to the flanges comprising means to clampingly draw the flanges upon the opposite sides of the sides of the blade heads, and elements projected axially through aligned perforations in the flanges and in intermediate portions of the frusto-conical surfaces.

20. In a saw, a central hub and an annular series of multi-toothed blades, the teeth thereof being disposed in a circle, the blades having the form of sheet metal segments with a face of each segment cut away to provide a head having a frusto-conical surface on a radially inner portion of the blade, the hub comprising axially opposite generally annular portions of substantial radial extent, one of which has a frusto-conical surface conforming to the frusto-conical surface of the blade heads, and means to secure the blades to the opposite annular portions of the hub comprising means to clampingly draw the annular portions upon opposite sides of the blade heads, and elements projected axially through aligned perforations in the annular hub portions and in intermediate portions of the frusto-conical surfaces.

21. In a saw, a central hub and an annular series of multi-toothed blades, the teeth thereof being disposed in a circle, the blades having the form of sheet metal segments with opposite faces of each segment cut away to provide a head having opposite double frusto-conical surfaces on a radially inner portion of the blade, the hub comprising axially opposite generally annular portions of substantial radial extent having each a frusto-conical surface conforming to the frusto-conical surfaces of the opposite sides of the blade segments, and means to secure the blades to the annular hub portions comprising means to clampingly draw the hub portions upon opposite sides of the blade heads, and an element projected axially through aligned perforations in the hub annular portions and in intermediate portions of the frusto-conical surfaces.

22. In a metal cutting circular saw having a peripheral circle of teeth and rotatable at speeds of 14,000 feet per minute or higher substantially without distortion of the original circular path of the teeth either axially or radially for rapidly sawing metal, a plurality of annular segmental metal blades having teeth on the outer circular portions thereof, a hub rigidly connected to the segments on radially inward portions thereof, the hub being rigid and axially and radially distortionless when rotated at the said tooth peripheral speed, the segments being of such restricted radial extent as to rotate substantially without radial stretch at said peripheral speed or higher, each of the blades having on radially inner portions thereof a frusto-conical surface and the hub having a radially outer annular portion having a surface thereon conforming to and engaging said frusto-conical surface.

23. In a metal cutting circular saw having a peripheral circle of teeth and rotatable at speeds of 14000 feet per minute or higher substantially without distortion of the original circular path of the teeth either axially or radially for rapidly sawing metal, a plurality of annular segmental metal blades having teeth on the outer circular portions thereof, a hub rigidly connected to the segments on radially inward portions thereof, the hub being rigid and axially and radially distortionless when rotated at the said tooth peripheral speed, the segments being of such restricted radial extent as to rotate substantially without radial stretch at said peripheral speed or higher, each of the blades having on radially inner portions thereof a frusto-conical surface and the hub comprising axially opposite generally annular portions one of which is provided with a frusto-conical surface conforming to the frusto-conical surface of the blades, and means for clamping the blades between the annular portions of the hub with the frusto-conical surfaces of the blades and of the annular portion in engagement, and elements projected axially through aligned perforations in the annular portions and in intermediate portions of the frusto-conical surfaces.

24. In a saw, a pair of body elements having oppositely disposed annular portions respectively, a series of blades between the annular portions providing a circular cutting edge, means for drawing the annular portions together to clamp the blades therebetween, one of the body elements having a plurality of circumferentially spaced inwardly generally radially extending outwardly open slots dividing its annular portion into a circular series of substantially resilient tongues integral with the body element for yieldingly clampingly engaging the blades.

25. A saw as described in claim 24 and in which the means for drawing the annular portions together comprises clamping elements projected through aligned perforations in the tongues of one body element and in the annular portion of the other.

26. A saw as described in claim 24 and in which the means for drawing the annular portions together comprises bolt elements projected through aligned perforations in the tongues of one body element and in the blades and in the annular portion of the other body element.

27. A saw as described in claim 24 and in which one of the body elements has an annular shoulder and the blades have circular radially inner edge portions engageable with the shoulder to position them.

28. In a saw, a central hub and an annular series of multi-toothed segmental blades secured to the hub and the teeth of the blades being disposed in a circle, the blades having the form of thin flat sheet metal segments, with a face cut away to provide inwardly radial relief on the outer portions of the blade and to render the blade of wedge shape on all radial sections in said outer relief portion, and, inwardly radially of the relieved outer portion, the blade being thicker than the relieved portion of minimum thickness, to provide a head for securing the blade to the hub.

29. A saw as described in claim 28 and in which the hub is provided with annular shoulder portions and the blades are provided with circular radially inner edge portions engaged with the annular shoulder portions to position the blades.

30. In a saw a central hub and an annular series of multi-toothed segmental blades secured to the hub, and the teeth of the blades disposed in a circle, the blades having the form of thin flat sheet metal sections progressively thinner proceeding inwardly radially from the toothed portion to provide inwardly radial relief on the outer portions of the blade and to render the relief portion of wedge shape on all radial sections, and inwardly of the relief portion the blade being of greater thickness than the relief portion of minimum thickness to provide a head for securing the blade to the hub.

31. A saw as described in claim 30 and in which the hub has annular shoulder portions and the blades have circular radially inner edge portions engageable with the shoulder portions to position the blades.

RALPH R. ROEMER.